(12) United States Patent
Johnson

(10) Patent No.: US 12,514,122 B2
(45) Date of Patent: Dec. 30, 2025

(54) JOHNSON AMBIENT HEAT ENERGY CONVERTER

(71) Applicant: Lonnie G. Johnson, Atlanta, GA (US)

(72) Inventor: Lonnie G. Johnson, Atlanta, GA (US)

( * ) Notice: Subject to any disclaimer, the term of this patent is extended or adjusted under 35 U.S.C. 154(b) by 700 days.

(21) Appl. No.: 17/893,638

(22) Filed: Aug. 23, 2022

(65) Prior Publication Data
US 2023/0011620 A1 Jan. 12, 2023

Related U.S. Application Data

(63) Continuation-in-part of application No. 16/876,212, filed on May 18, 2020, now Pat. No. 11,489,185.

(60) Provisional application No. 63/236,015, filed on Aug. 23, 2021.

(51) Int. Cl.
*H10N 10/857* (2023.01)

(52) U.S. Cl.
CPC ................. *H10N 10/857* (2023.02)

(58) Field of Classification Search
CPC ............ H01M 8/0247; H01M 8/0271; H01M 8/0276; H01M 8/0297; H01M 8/2483; H01M 8/0206; H01M 8/0258; H01M 8/0202; H01M 8/0273; H01M 8/04029; Y02E 60/50
See application file for complete search history.

(56) References Cited

U.S. PATENT DOCUMENTS

| | | |
|---|---|---|
| 2002/0172844 A1 | 11/2002 | Ito |
| 2015/0211132 A1 | 7/2015 | MacKinnon |

*Primary Examiner* — Helen Oi K Conley
(74) *Attorney, Agent, or Firm* — Baker, Donelson, Bearman, Caldwell & Berkowitz, PC

(57) ABSTRACT

An ambient heat energy converter includes a first positive evaporating electrode which functions as the cathode, a membrane separator, a porous barrier membrane, and a second, negative condensing electrode which functions as the anode. Electrodes and are porous and facilitate hydrogen-oxygen reactions that electrolyze and reduce water respectively. Porous barrier membrane allows water and protons to pass through but prevents hygroscopic acid or base ions in condensing electrode from passing through, only water and protons can pass. During operation, membrane separator's high affinity for liquid water maintains a tension that pulls liquid water through porous barrier membrane from condensing electrode. Barrier membrane does not allow ions other than water that comprise the hygroscopic material in condensing electrode to pass through. Conversely, the hygroscopic nature of condensing electrode maintains water tension in the opposite direction. A housing surrounds the electrodes and creates a free flowing path.

6 Claims, 7 Drawing Sheets

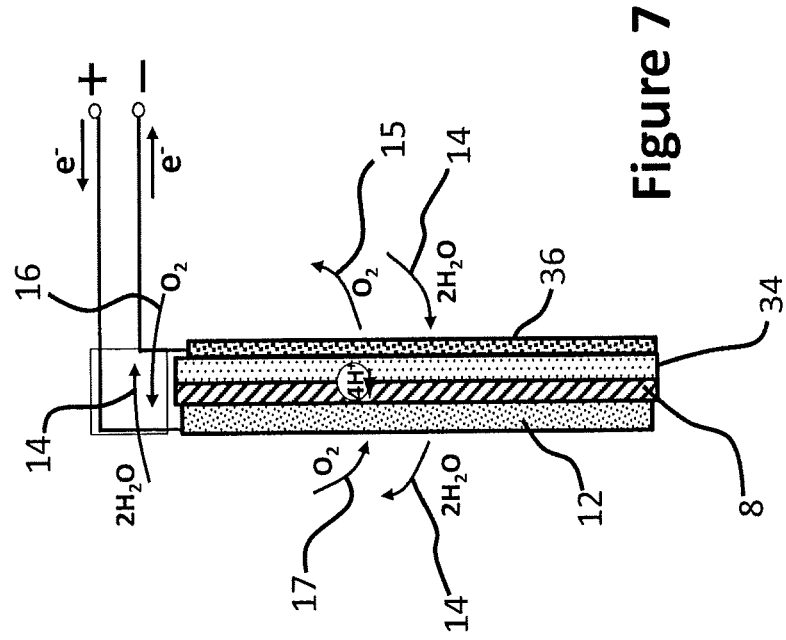

ized water or water vapor through the ion conductive membrane electrode and into contact with the hygroscopic solution. The previously disclosed converters generate power driven by changes in temperature and humidity whereby moisture from ambient air transitions into and out of the hygroscopic liquid through the membrane electrode assembly to generate power as the hygroscopic material maintains thermodynamic equilibrium with ambient vapor pressure and temperature. The prior converter is limited to operating in environments where there are changes in humidity and/or temperature.

Thus, the need remains for an ambient energy converter that can generate electricity by extracting heat from the environment without the need for transients in temperature or humidity. It is towards this need that the present invention is directed.

BRIEF SUMMARY OF THE INVENTION

A heat to electric energy converter for operation with a working fluid being in gas and liquid phases, the electric energy converter comprises a first electrode, the first electrode being hygroscopic at a first working fluid absorption potential, a second electrode, the second electrode being hygroscopic at a working fluid absorption potential that is different from the absorption potential of the first electrode whereby a voltage potential exist between the two electrodes, an electrochemical barrier, the barrier being coupled between the first electrode and second electrode and conducting at least one ion species of the working fluid between the first electrode and the second electrode, and the first and second electrode being exposed to and coupled to each other by a gas, the gas comprising at least one constituent of the working fluid.

BRIEF DESCRIPTION OF DRAWINGS

FIG. 7 is a schematic, cross-sectional view an ambient energy converter in a preferred form of the invention having multiple thin film layers for low impedance.

DETAILED DESCRIPTION

The present invention's operating principal is based on the thermo-galvanic effect wherein heat is converted into electricity in an electrochemical cell where the voltage is a direct function of reactant phase and concentration differential across a proton conductive membrane. Nafion is disclosed herein as a membrane material that is representative of a range of materials that are suitable for operation of the invention. As described by Wikipedia, Nafion is a brand name for a sulfonated tetrafluoroethylene based fluoropolymer-copolymer discovered in the late 1960s by Walther Grot of the DuPont Corporation. Nafion is a brand of the Chemours company. It is the first of a class of synthetic polymers with ionic properties that are called ionomers. Nafion's unique ionic properties are a result of incorporating perfluorovinyl ether groups terminated with sulfonate groups onto a tetrafluoroethylene (PTFE) backbone. Nafion has received a considerable amount of attention as a proton conductor for proton exchange membrane (PEM) fuel cells because of its excellent thermal and mechanical stability. Nafion is highly hygroscopic.

Figure 1:
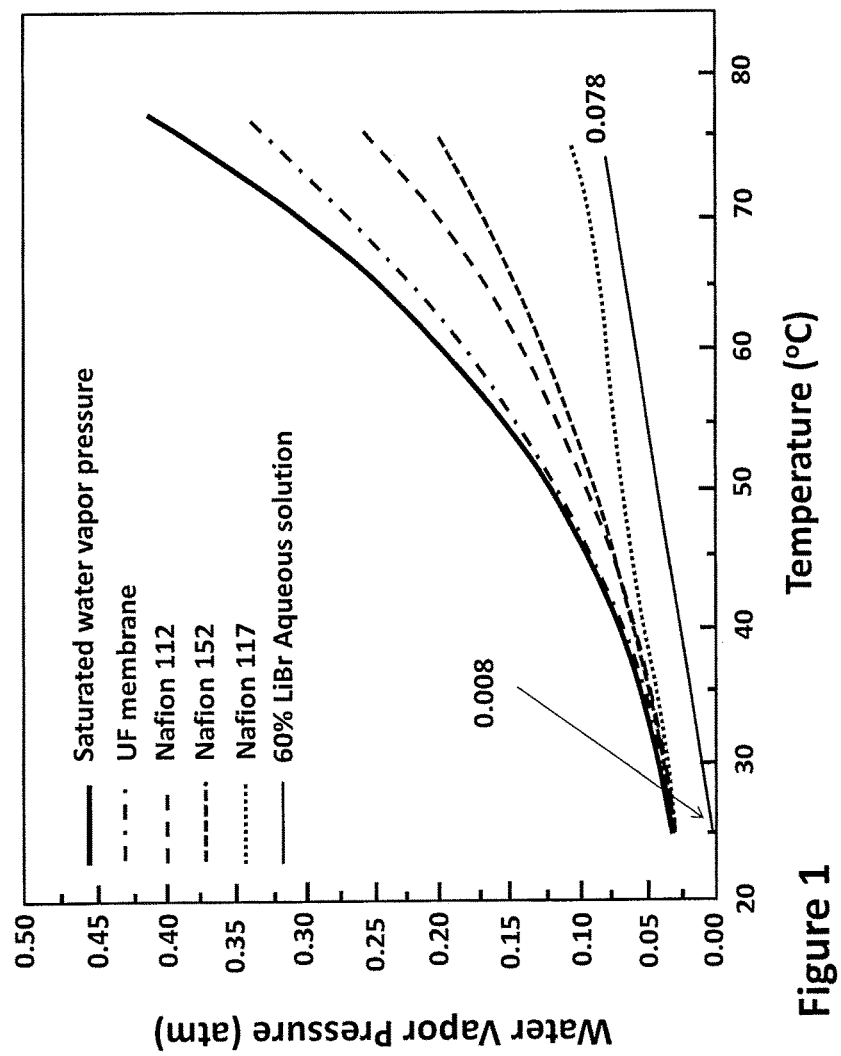
FIG. 1 is a chart showing the water vapor pressure versus temperature for water, several proton conductive membrane formulations and 60% lithium bromide solution.

FIG. 1 shows the water vapor pressure of hydrated Nafion proton conductive membrane material and 60% weight concentrated lithium bromide (LiBr)/water solution. It should be noted that the vapor pressure of the LiBr solution is always lower than the water vapor pressure of hydrated Nafion at all temperatures. In fact, in the 30° C. to 40° C. temperature range, the vapor pressure of water contained within Nafion is very close to that of saturated water. On the other hand, Nafion's affinity for liquid water is very different. As such, the working fluid here is water.

Nafion is a classic example certain materials which uptake significantly more water in contact with liquid water than it does in contact with saturated water vapor. The converter's operating principal is based on the Schroeder's paradox which is a well-known, but not fully understood, phenomenon. The paradox exists in many polymers and gels. Essentially, the uptake of solvent in the polymer depends on the interaction with the boundary phase. See: Hydration of Ionomers and Schroeder's Paradox in Nafion, Viatcheslav Freger, J. Phys. Chem. B 2009, 113, 24-36, incorporated herein by reference in its entirety.

The phenomenon occurs because the interface controls the water uptake (even in bulk membranes). In addition, interactions with solid materials show similar impact on water uptake depending on whether they are hydrophilic or hydrophobic. The asymmetric character of the Nafion membrane's affinity for liquid water vs. water vapor can create a diode like polarization effect. The observations are consistent with Half-Cell Ion Concentration Polarization on Nafion-Coated Electrode by Rhokyun Kwak J. Phys. Chem. Lett. 2018, 9, 2991-2999. Kwak observed unique diode like current rectification by Nafion coated electrodes, incorporated herein by reference in its entirety.

At 25° C., the number of water molecules absorbed per sulfonic-acid group within Nafion is 22 in contact with liquid water whereas it is only 14 when exposed to saturated water vapor, see: Gi Suk Hwang in "Understanding Water Uptake and Transport in Nafion Using X-ray Microtomography," pubs.acs.org/macroletters, incorporated herein by reference in its entirety.

Figure 2:
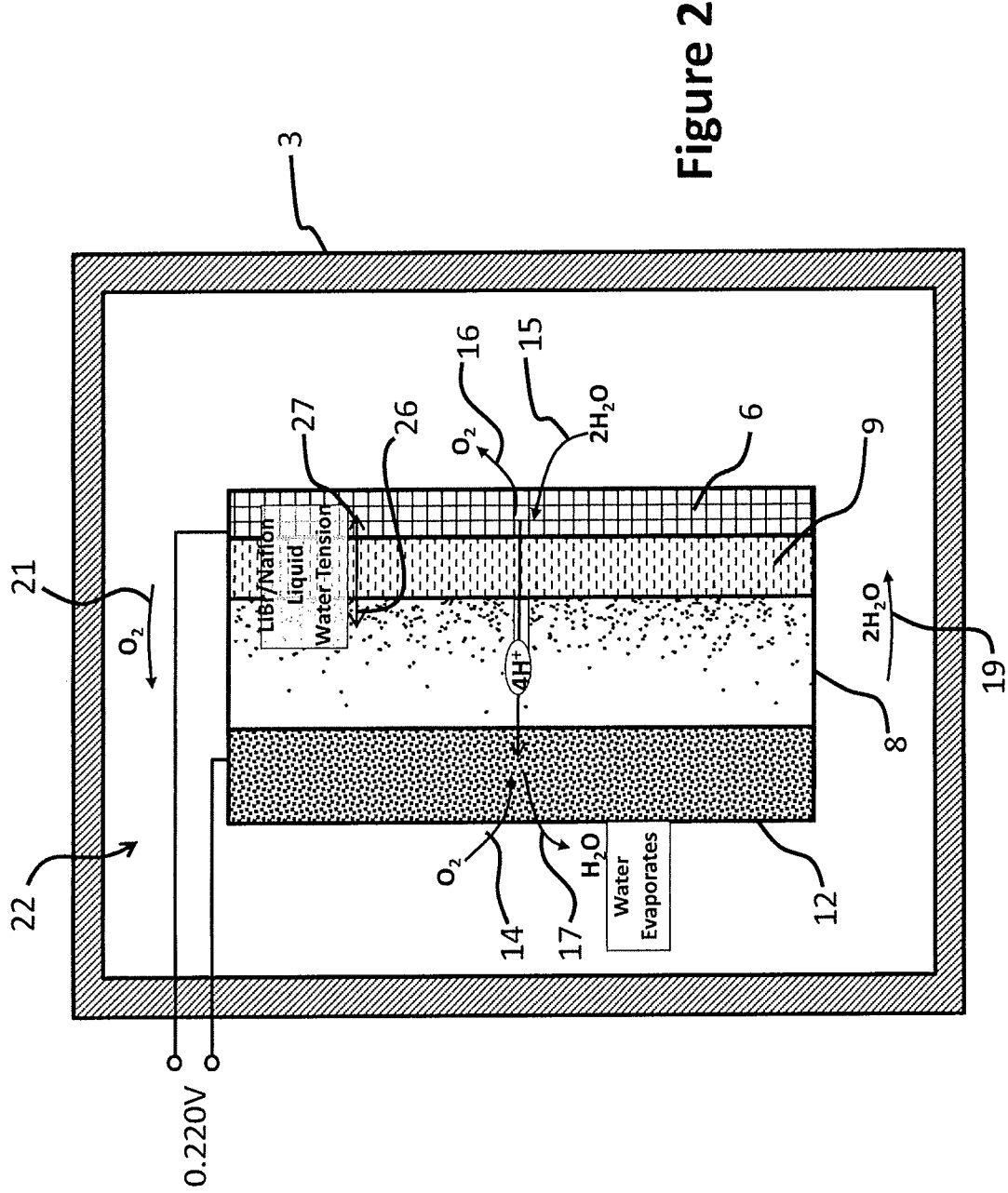
FIG. 2 is a functional diagram of an ambient heat to electric converter representative of the invention.

FIG. 2 shows the ambient heat converter in a preferred basic form. The heat energy converter includes first positive evaporating electrode 12 which functions as the cathode, membrane separator 8, porous barrier membrane 9 and second, negative condensing electrode 6 which functions as the anode all together in a layered structure. Electrodes 6 and 12 are porous and facilitate hydrogen-oxygen reactions that electrolyze and reduce water respectively. Membrane separator 8 is made of a hygroscopic proton conductive material, such as Nafion. Barrier membrane 9 is a porous water selective membrane such as those used in reverse or forward osmosis purification of water. Porous condensing electrode 6 is hygroscopic whereas evaporating electrode 12 is hydrophobic. Porous barrier membrane 9 allows water and protons to pass through but prevents hygroscopic acid or base ions in condensing electrode 6 from passing through, only water and protons can pass.

Condensing electrode 6 may be made hygroscopic by including a hygroscopic solution such as an acid solution, preferably phosphoric acid or a base solution, preferably water and Lithium Bromide. The hydrophobic nature of evaporating electrode 12 is similar to that of conventional fuel cell cathodes designed for water to quickly evaporate as it is generated during hydrogen oxygen reactions. During operation, membrane separator's 8 high affinity for liquid water maintains a tension that pulls liquid water through porous barrier membrane 9 from condensing electrode 6 as indicated by directional arrow 26. Barrier membrane 9 does not allow ions other than water that comprise the hygroscopic material in condensing electrode 6 to pass through. Conversely, the hygroscopic nature of condensing electrode 6 maintains water tension in the opposite direction as indicated by directional arrow 27.

The basic hydrogen/oxygen/water reactions across the cell were described by Iwahara (Sintered Oxides And Its Application To Steam Electrolysis For Hydrogen Production; H. Iwahara, Solid State Ionics 3/4 (1981) 359-363), incorporated herein by reference in its entirety. He demonstrated Nerst voltage for the reaction illustrated Reaction 1 using $SrCe0.95Yb0.05O3-\alpha$ and $SrCe0.95Mg0.05O3-\alpha$ in a series of Proton Conduction experiments that demonstrated Nernst voltage for the water vapor concentration reaction.

Reaction 1.

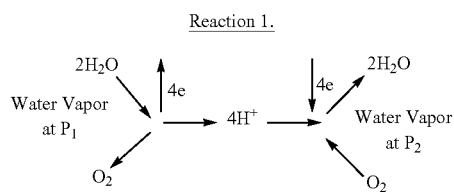

The solid oxide proton conductive material functioned as a water barrier and thereby prevented the pressures from equalizing directly by gas flow across the cell.

Reaction 2.

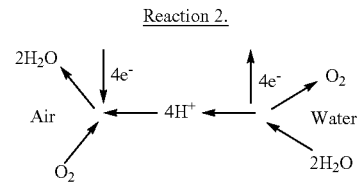

Kim demonstrated the hydrogen/oxygen/water reaction with a phase change as illustrate by Reaction 2, (Unprecedented Room-Temperature Electrical Power Generation Using Nanoscale Fluorite-Structured Oxide Electrolytes; Sangtae Kim, et. al.; Advanced Materials; DOI: 10.1002/adma.200700715), incorporated herein by reference in its entirety. Kim used nano-structured yttrium stabilized zirconia (YSZ) and nano-structured samaria-doped ceria (SDC) as proton conductive barriers. When both sides of the cells were exposed to dry air, the voltage was nearly zero. When wet air (PH2O~$1.3\times10^{-2}$ bar) was introduced to one side while the other side remained exposed to dry air, the voltage increased to about −15 mV for the YSZ cell and to about −33 mV for the SDC cell. In this case the wet-air side was the anode and the dry-air side was the cathode. The dry sides of the cells were next immersed into pure (de-ionized) water while still exposing the other side of the cell to wet air. Under this condition, the water activity gradient across the electrolyte reversed (and hence the polarity of the cell) since the activity of water at the air side has become lower than at the water side. The voltage increased to reach about +180 mV and about +400 mV for the YSZ and the SDC cells, respectively. Since the nano-structured electrolytes used by Kim contained water along grain boundaries within the material, the variations in open circuit voltage could be explained by reaction potentials with the electrolytes themselves and by their water permeability. Kim was only able to achieve about 200 nA/cm2 of current with his experiments.

Operation of the present invention is driven by heat of evaporation extracted by the converter from its environment. It uses membrane separator's 8 lower affinity for water vapor relative to its affinity for liquid water. Water will preferentially evaporate from membrane separator 8 through evaporating electrode 12 as membrane separator 8 maintains high water tension at its interface with barrier membrane 9 as indicated by direction arrow 26. The hygroscopic nature of condensing electrode 6 tends to pull water in the opposite direction through barrier membrane 9 as indicated by directional arrow 27. As heat evaporates water from evaporating electrode 12, as indicated by directional arrow 17, membrane separator 8 becomes water depleted at the evaporating electrode 12 interface. This evaporation results in a concentration gradient as indicated by the dot pattern in the drawing of membrane separator 8. The concentration gradient causes membrane separator 8 to pull water through barrier membrane 9 from condensing electrode 6 in direction of arrow 26 with greater force causing condensing electrode 6 to become depleted. To maintain vapor pressure equilibrium at the condensing electrode 6 to air interface, water vapor condenses into condensing electrode 6 from the surrounding air as indicated by arrow 15. Operation of the cell is continuous as heat of evaporation is supplied by the cell's external environment.

Thus, as heat from the cell's external environment evaporates water from evaporating electrode 12, flow in one direction is achieved as Nafion pulls liquid water from its interface with water permeable barrier membrane 9. Water is reduced at evaporating electrode 12 consuming oxygen and evaporates whereas water condenses at condensing electrode 6 releasing oxygen. Operation is continuous as water vapor circulates from evaporating electrode 12 to condensing electrode 6 as indicated by directional arrows 17, 19 and 15 while oxygen circulates from condensing electrode 6 to evaporating electrode 12 as indicated by directional arrows 16, 21 and 14. As such, the water vapor and oxygen gas freely flows from one electrode to the other electrode. The term freely flows means that the gas or vapor does not have to pass through the membrane separator on this path. A relatively steady state condition of amount of water within each of the components of the cell can thus be achieved.

A voltage potential is maintained between electrodes 6 and 12 with ionic conductivity of membrane separator 8 and the ionic conductivity of water within barrier membrane 9 providing ion conductive continuity cross the cell.

Under catalytic activity within the electrodes and the electrochemical voltage potential of the cell, water is electrolyzed at condensing electrode 6 with oxygen being released to the air inside a surrounding housing 3. The resulting protons are conducted by water through barrier membrane 9 and on through membrane separator 8 to evaporating electrode 12 as electrons are routed through an external circuit connected to circuit/terminals 22. The protons and electrons react with oxygen at evaporating electrode 12 to reproduce water. The process continues as both electrodes maintain water vapor pressure equilibrium with the air within the cell as heat evaporates water from evaporating electrode 12 and water vapor condenses into condensing electrode 6. The 1.2 volts required to electrolyze water at condensing electrode 6 is canceled by the 1.2 volts generated by the reduction of water at evaporating electrode 12. The net 220 mV representative voltage of the cell at terminals 22 is determined by the water vapor concentration differential between condensing electrode 6 and evaporating electrode 12 plus converted the energy of condensation of water entering condensing electrode 6.

Figure 3:
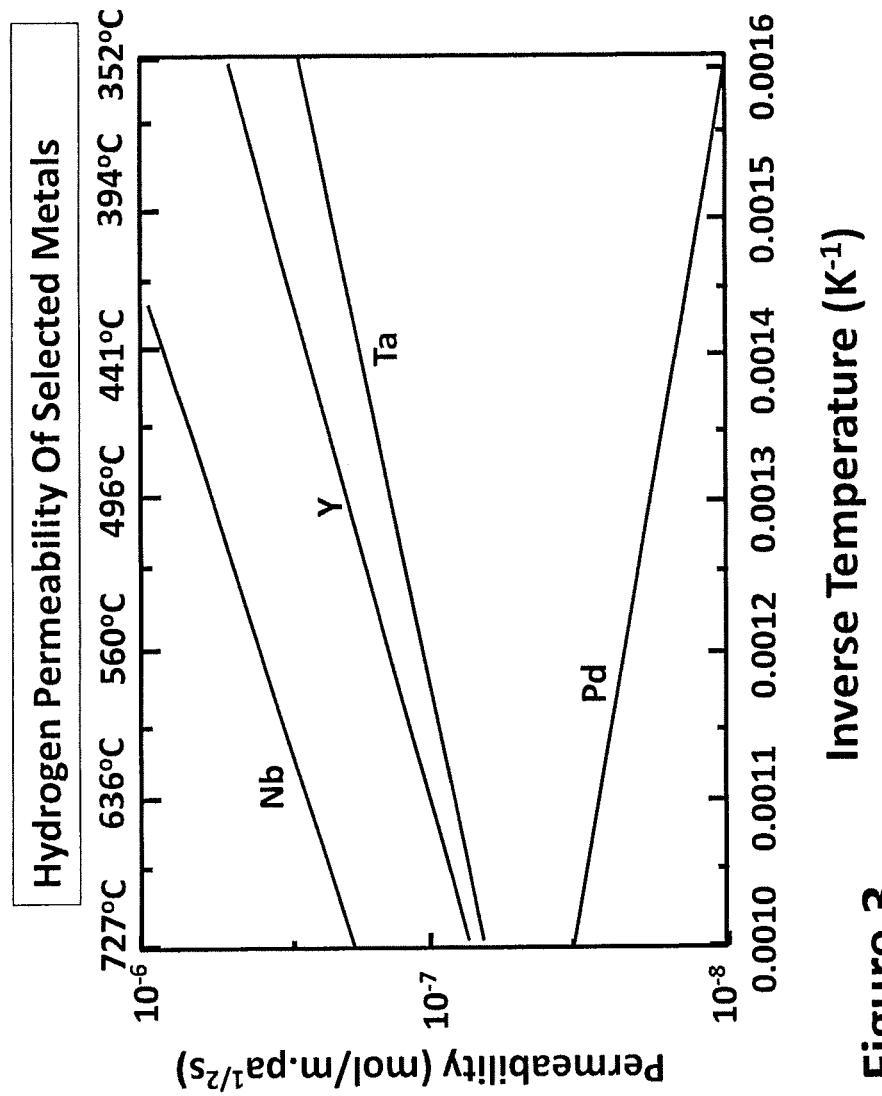
FIG. 3 a graph showing the hydrogen permeability of several selected metals.

Solid barrier materials may be employed in an alternate configuration of the invention. FIG. 3 shows the hydrogen permeability of Palladium, Tantalum, Yttrium and Niobium. Palladium is a typical material used for hydrogen separation whereas Tantalum, Yttrium and Niobium are seldom used because they lose their mechanical properties in hydrogen environments due to embrittlement. The present invention does not involve the use of hydrogen as a gas; therefore, higher diffusivity material such as tantalum, Yttrium and Niobium can potentially be used.

Figure 4:
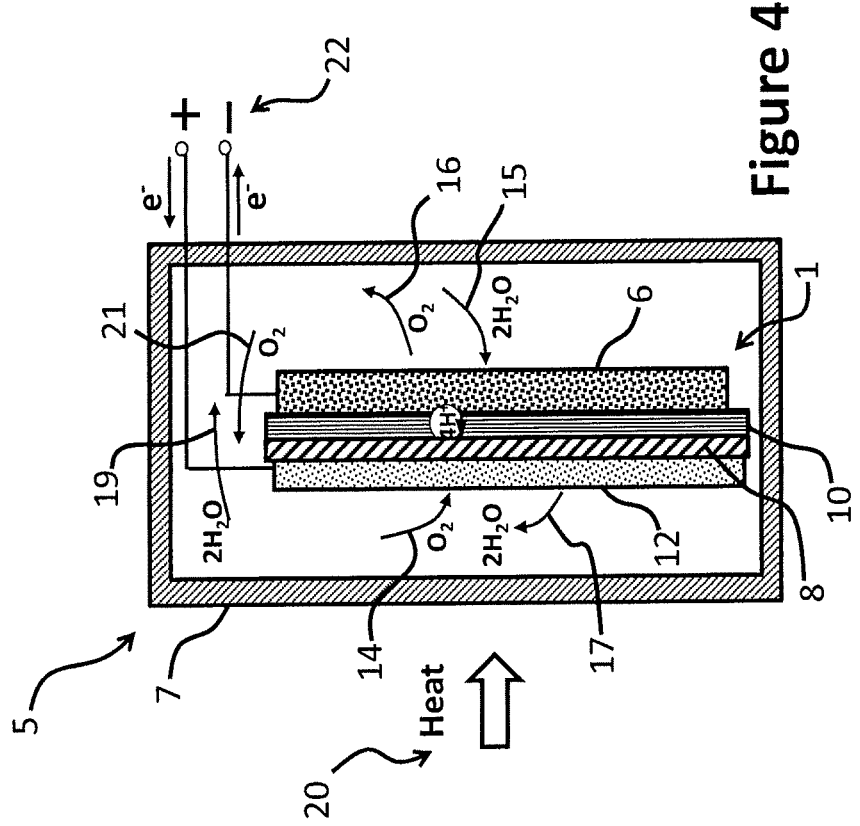
FIG. 4 is a functional diagram showing a heat to electric converter using a solid metal hydrogen permeable hygroscopic solution barrier.

Referring now to FIG. 4, self-contained converter system 5 is shown where in converter 1 is enclosed within housing or casing 7. Hydrogen permeable solid barrier or barrier layer 10 is sandwiched between proton conductive material or membrane separator 8 and hygroscopic condensing electrode 6. Operation of the device is as previously described except barrier membrane 9 is replaced by hydrogen permeable solid barrier layer 10. Barrier layer 10 may be made of palladium, tantalum, yttrium, niobium or other suitable barrier material that has the net effect of allowing protons to pass through but not water. Barrier 10 may alternatively be a proton conductive material such as ceramic yttrium-doped barium zirconate ($YBaZrO_3$) or Titanium Dioxide ($TiO_2$), see: "Review: Recent Progress in Low-temperature Proton-conducting Ceramics", Yuqing Mengl, J Mater Sci (2019) 54:9291-9312, incorporated herein by reference in its entirety. Given the transport properties of these materials, protons are able to move from condensing electrode 6 to evaporating electrode 12 under the electrochemical potential of the cell.

Heat of evaporation supplied by external heat source (heat) 20 is converted into electrical power under the cell's electrochemical potential. The voltage of the cell is defined by the water vapor concentration differential between condensing electrode 6 and evaporating electrode 12 plus the energy of condensation of water condensing into condensing electrode 6. Water will preferentially evaporate from evaporating electrode 12 due to its lower attraction for water vapor relative to the attraction for water vapor by condensing electrode 6. Migration of water vapor from evaporating electrode 12 to condensing electrode 6 creates a concentration gradient across membrane separator 8. As condensing electrode 6 pulls water vapor from evaporating electrode 12, a relatively steady state is maintained by conduction of protons through hydrogen permeable solid barrier layer 10 with release of oxygen from condensing electrode 6 and consumption of oxygen in evaporating electrode 12. The net effect is equivalent to movement of water from condensing electrode 6 back to evaporating electrode 12. The process continues as the reduced concentration of water within condensing electrode 6 causes it to attract and condense water to maintain vapor equilibrium with the air as indicated by arrow 15 which is, in turn, supplied by evaporating electrode 12, the water vapor pressure within housing 7 is the same for condensing electrode 6 as it is for evaporating electrode 12.

This phenomenon appears to occur because the liquid water absorption potential at the interface between membrane separator 8 and solid barrier layer 10 is higher than the water vapor absorption potential at the interface between membrane separator 8 and evaporating electrode 12 consistent with the Schroeder's paradox. Whereas hygroscopic condensing electrode 6 is able to attract water vapor from evaporating electrode 12, Nafion's higher affinity for liquid water at the barrier interface maintains a continuous process with heat of evaporation supplied to evaporating electrode 12 being converted into electrical energy.

Figure 5:
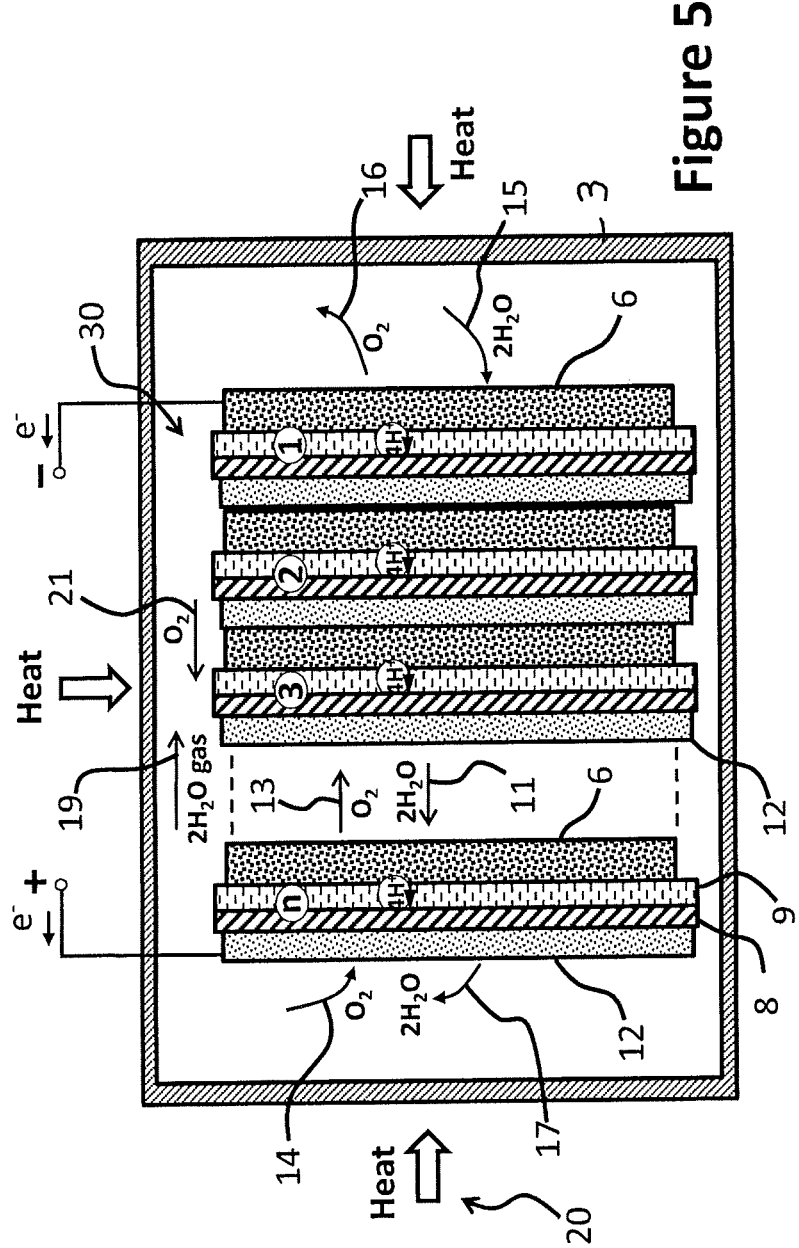
FIG. 5 shows a stack of cells electrically and electrochemically coupled in series within a casing.

FIG. 5 shows a stack of cells "1" through "n" inside a housing or casing 3. The cells are electrically and electrochemically coupled in series. The series electrical connections achieve a cumulative overall voltage output. Water vapor 11 released from one cell's evaporating electrode 12, cathode, is absorbed by its adjacent cell's condensing electrode 6, anode. Conversely, oxygen indicated by arrow 13 is released by a condensing electrode 6, anode, as water is electrolyzed therein, is absorbed by the adjacent evaporating electrode 12, cathode, in the series to produce water. The oxidation reduction reactions that cause water migration from electrode between cells amounts to continuous pseudo circulation of water via oxidation reduction reactions as the pairing of hydrogen and oxygen atoms within any given water molecule, of course, does not necessarily remain the same atoms. Heat 20 supplied to the cell is consumed by evaporation of water from the positive electrodes (cathodes) of the cells and converted into electrical power as water condenses into the negative electrodes 6 (anodes). Similar to the previously described functioning of a single cell, water vapor and oxygen circulate within the housing. Water evaporates from (cathode) evaporating electrode 12 of the final cell in the stack as indicated by arrow 17, circulates around the stack as indicated by arrow 19, and condenses into the (anode) condensing electrode 6 of the first cell in the stack as indicated by directional arrow 15. Oxygen is electrolyzed out of water in anode 6 of the first cell in the stack as indicated by directional arrow 16, circulates around the stack as indicated by directional arrow 21, and enters the (cathode) evaporating electrode 12 of the final cell in the stack as indicated by directional arrow 14 where it is reduced into water which subsequently evaporates.

Figure 6:
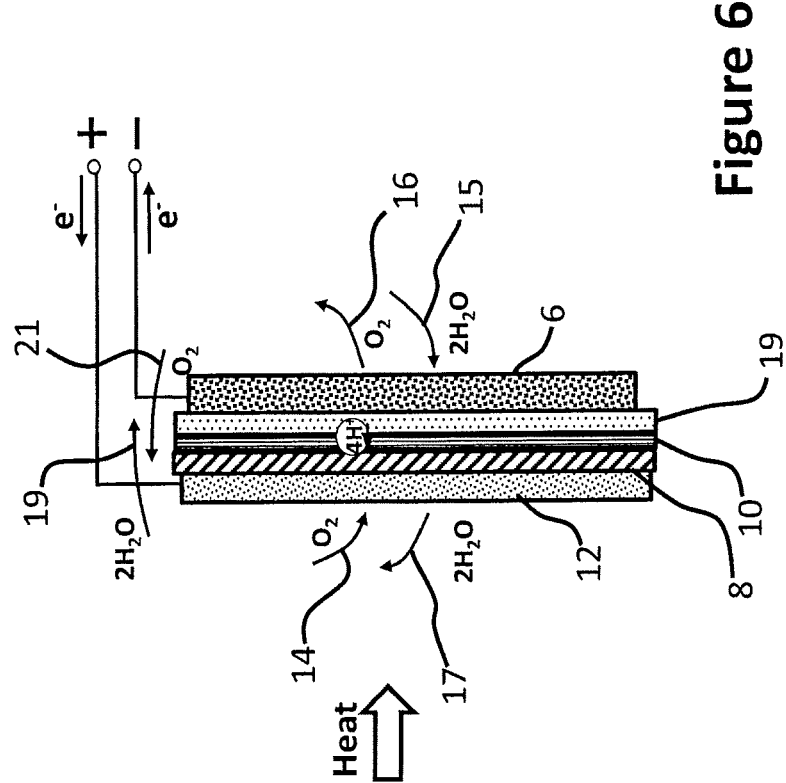
FIG. 6 is a schematic, cross-sectional view of an ambient energy converter in a preferred form of the invention having a thin film, metal hydrogen permeable water barrier.

FIG. 6 shows an embodiment of the invention with hydrogen permeable solid barrier layer 10 in thin film form to lower cell impedance. Hydrogen permeable solid barrier 10 is coated onto porous substrate 19. The power output of the cell is determined by a combination of electrochemical reaction kinetics within the electrodes and the proton conductive impedance across the layers of the cell. The impedance of barrier 10 is reduced by implementing it as a thin coating having thickness from 30 nanometers to 10 micrometers. Higher power density is achieved by including ion conductive, liquid or solid material, within the pores of (substrate) membrane separator 19. The combination of the ion conductive (substrate) membrane separator 19 and thin film barrier 10 results in lower overall cell impedance. The low impedance structure enables higher power density.

FIG. 7 illustrates an embodiment of the invention that is suitable for assembly as a thin film structure for increased power density. Negative condensing electrode 36 may be a solid electrically conductive water permeable material such as porous graphite. It may be 2.5 um to 100 um thick or thicker. Negative condensing electrode 36 is coated with a thin layer of hygroscopic ceramic electrolyte or electrolyte layer 34. Electrolyte 34 may be 30 nm to 10 um thick and can be applied by sputter deposition. Electrolyte layer 34 may be a material such as TiO2 or other proton conductive polycrystalline or nano-crystalline ceramic material. TiO2 is hygroscopic material wherein water contained along crystalline grain boundaries provides the mechanism for proton conduction. Nafion layer (membrane separator 8) functions as previously described. It may be applied as a thin coating using a liquid solvent based precursor. Layer (membrane separator 8) may be 1 to 25 um thick. Evaporating electrode 12 a hydrophobic, electric and ion conductive coating is applied to the surface of the Nafion. It may be applied by slurry for spray coating using an evaporative solvent based precursor. The desired water tension gradient across membrane separator 8 is created by having hydrophobic water vapor evaporating electrode 12 on one side of and solid water containing hygroscopic ceramic electrolyte 34 on the other. Operation of the cell is as previously described with water being electrolyzed in condensing electrode 6 and reduced in evaporating electrode 12 under the electrochemical potential of the cell.

While not specifically shown, all embodiments may include a housing surrounding the electrode assembly.

As such, a heat to electric energy converter for operation with a working fluid being in gas and liquid phases, the electric energy converter comprises a first electrode, the first electrode being hygroscopic at a first working fluid absorption potential, a second electrode, the second electrode being hygroscopic at a working fluid absorption potential that is different from the absorption potential of the first electrode whereby a voltage potential exist between the two electrodes, an electrochemical barrier, the barrier being coupled between the first electrode and second electrode and conducting at least one ion species of the working fluid between the first electrode and the second electrode, and the first and second electrode being exposed to and coupled to each other by a gas, the gas comprising at least one constituent of the working fluid.

It thus is seen that an ambient energy converter is now provided which overcomes problems associated with prior art systems. While this invention has been described in detail with particular references to the preferred embodiments thereof, it should be understood that many modifications, additions and deletions, in addition to those expressly recited, may be made thereto without departure from the spirit and scope of the invention.

The invention claimed is:

1. A heat to electric energy converter for operation with a working fluid being in gas and liquid phases, the electric energy converter comprising:
    a first electrode, the first electrode being hygroscopic at a first working fluid absorption potential;
    a second electrode, the second electrode being hygroscopic at a working fluid absorption potential that is different from the absorption potential of the first electrode whereby a voltage potential exist between the two electrodes;
    an electrochemical barrier, the barrier being coupled between the first electrode and second electrode and conducting at least one ion species of the working fluid between the first electrode and the second electrode, and
    the first and second electrode being exposed to and coupled to each other by a gas, the gas comprising at least one constituent of the working fluid.

2. The heat to electric converter as disclosed in claim 1 wherein the electrochemical barrier comprises a metal, the metal being permeable to hydrogen and a proton conductive material that has a different absorption affinity for water in the gas phase relative to its absorption potential for water in the liquid phase.

3. The heat to electric converter as disclosed in claim 1 wherein the electrochemical barrier comprises a working fluid permeable membrane and a proton conductive material that has a different absorption affinity for water in the gas phase relative to its absorption potential for water in the liquid phase.

4. The heat to electric converter as disclosed in claim 3 wherein the working fluid permeable membrane is permeable substantially exclusively to the working fluid.

5. The heat to electric converter as disclosed in claim 1 wherein the converter further includes a housing structure.

6. The heat to electric converter as disclosed in claim 2 wherein multiple membrane electrode assembly cell are stacked in series within the housing so as to produce a higher overall output voltage.

* * * * *